Sept. 30, 1952 — W. E. GAUTSCHE, JR — 2,611,984
FISHING LURE
Filed July 29, 1949
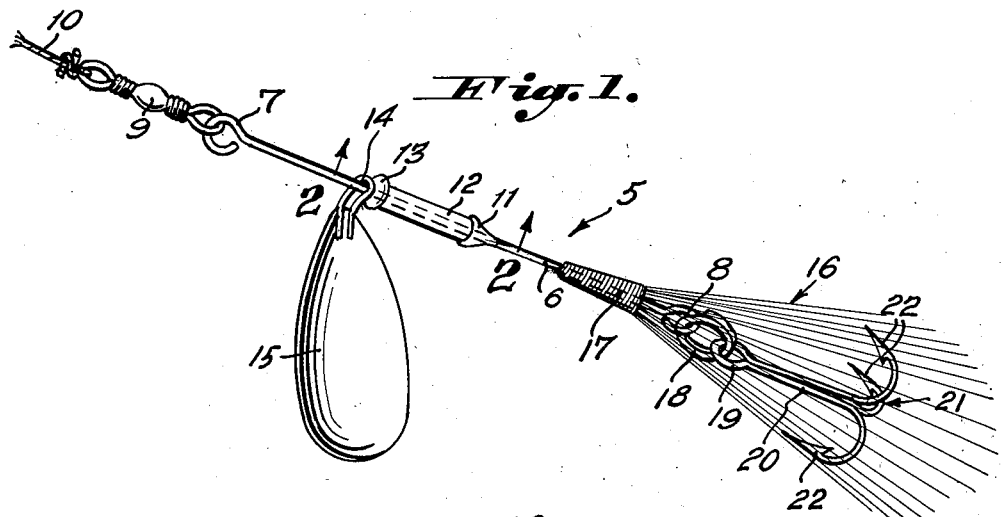
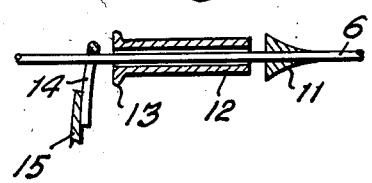
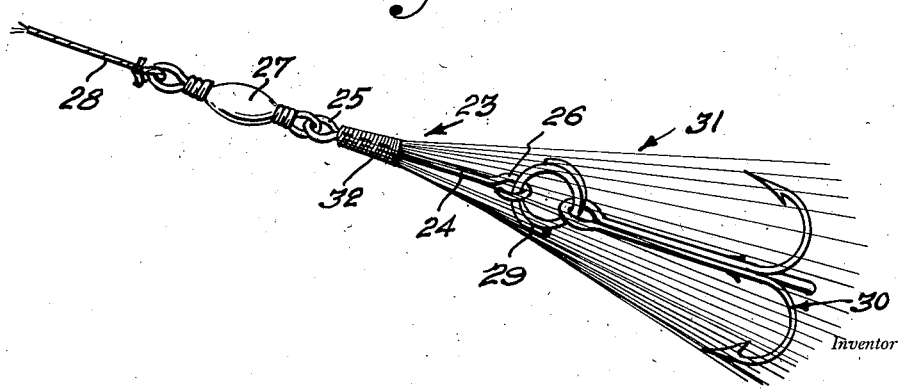
Inventor
William E. Gautsche, Jr.
By John N. Randolph
Attorney Patented Sept. 30, 1952

2,611,984

UNITED STATES PATENT OFFICE 2,611,984

FISHING LURE

William E. Gautsche, Jr., New London, Wis.

Application July 29, 1949, Serial No. 107,555

1 Claim. (Cl. 43—42.11)

This invention relates to a novel construction of fishing lure having a rigid shaft or rod eliminating the use of wire snaps conventionally used to form a joint between the shaft or rod sections of a lure and which cause anglers considerable trouble by becoming unhooked and also by breaking and thereby rendering the lure useless.

A important object of the present invention is to provide a lure or bait which can be cast with greater ease and similar to a plug rather than like a conventional bucktail and which is almost impossible to tangle as frequently occurs in casting baits having jointed shaft or rod sections.

A further and particularly important object of the present invention is to provide a lure or bait wherein the hair is secured to the rigid shaft or rod and the fishhook detachably connected to an end of said rod or shaft thereby enabling fishhooks of different sizes to be applied to the lure without otherwise disturbing the lure and which is impossible with conventional lures where the hair is tied to the hook shank.

Still a further and particularly important object and advantage of the present invention resides in the fact that the hook by being fastened beyond the secured end of the hair can not interfere with the action of the hair when the lure is drawn through the water and will not become tangled.

Another object of the invention is to provide a lure wherein the hook is free to drop down relatively to the hair or bucktail and accordingly has a tendency, when the lure is taken by a fish, to fall to the bottom of the fish's mouth so that a slight pressure on the lure will set the hook in the jaw of the fish.

Still another object of the invention is to provide a lure wherein the hook extends to adjacent the trailing end of the lure so that a fish will be hooked thereby even on a very short strike which would ordinarily only nip the bucktail.

Still a further object of the invention is to provide a lure which has a freer retrieve than conventional bucktail lures and wherein the hair streams back a sufficient distance to cover the hook while being drawn through the water yet permits sufficient freedom of the hook to permit it to fall to the bottom or side when the lure is taken by a fish for exposing the barbed end of the hook to insure setting of the lure in the fish's mouth and to prevent the fish from throwing the lure from its mouth.

Various other objects and advantages of the invention will hereinafter become more fully apparent from the following description of the drawing, illustrating preferred embodiments of the invention, and wherein:

Figure 1 is a side elevational view of a preferred form of the improved fish lure or bait;

Figure 2 is a longitudinal sectional view partly in side elevation thereof taken substantially along a plane as indicated by the line 2—2 of Figure 1, and Figure 3 is a side elevational view of another form of the lure.

Referring more specifically to the drawing, and first with reference to the form of the invention as illustrated in Figures 1 and 2, the novel lure or bait in its entirety is designated generally 5 and includes an elongated leader or shaft 6 of sufficiently heavy gauge wire to be substantially rigid and which is provided with an eye 7 at its leading end and with a similar eye 8 at its trailing end. One end of a conventional swivel 9 is connected to the eye 7 and has an end of a fishing line or leader 10 connected to the opposite end of said swivel. The leader or shaft 6 is provided with an enlargement 11 intermediate of its ends forming an annular shoulder which faces toward its forward end or the eye 7 to provide a stop for a sleeve 12 which is rotatably mounted on the shaft 6 between the enlargement 11 and the eye 7 and which bears rotatably against the forwardly facing shoulder of said enlargement. The forward end of the sleeve 12, which is remote to the enlargement 11, is provided with an annular flange or enlargement 13 against which a bail or loop 14 of wire bears. The bail or loop 14 loosely engages the leader or shaft 6 between its forward eye 7 and the sleeve 12 and the terminals or legs thereof are suitably secured to a side of one end of a spinner 15 which is thereby mounted for rotation around the forward portion of the shaft 6.

A bucktail 16 is secured at one end thereof by wrappings 17 to the leader or shaft 6 between its enlargement 11 and its trailing eye 8 and the free end of said bucktail 16 extends rearwardly from its forward end, which is secured by the wrappings 17, to substantially beyond the trailing shaft eye 8. The bucktail 16 is formed of a multiplicity of strands of hair of any desired color.

A split ring 18 preferably formed of approximately two convolutions is secured to the trailing shaft eye 8 for detachably engaging the eye 19 at one end of a shank 20 of a fishhook 21 which is provided with a plurality, preferably three, barbed ends 22. The ring 18 and fishhook 21 are normally disposed in the bucktail 16, the hairs of which stream rearwardly to beyond the trailing end of said fishhook.

From the foregoing it will be readily apparent that the lure or artificial bait 5 may be readily cast due to the fact that the shaft 6 thereof is rigid, rather than being jointed as in conventional lures so that the fishhook 21 cannot become tangled with a section of the shaft. The rigidity of the shaft 6 will permit the lure 5 to be cast similarly to a plug and the bucktail 16 will tend to hold the fishhook 21 in an extended position while casting. In retrieving the lure 5 after casting, the spinner 15 will revolve freely about the shaft 6 as the lure is drawn through the water and the long, straight line construction of the lure enables it to be retrieved or drawn through the water more freely and with the hairs of the bucktail 16 streaming back to cover the hook. With the bucktail 16 secured, as previously described and as illustrated in Figure 1 and with the forward part of the shaft 6 provided with the spinner 15, the lure will wiggle when drawn through the water to very realistically simulate a live fish bait. The hook 21 has a tendency to drop to the bottom or one side of the bucktail 16 so that when a fish strikes the bucktail the hook readily sets itself in the bottom or one side of the mouth of the fish, making it substantially impossible for a fish to strike the bucktail without one of the barbed ends 22 becoming set in the fish's mouth and substantially preventing a fish from grabbing the bucktail and thereafter throwing it from its mouth. Since the barbed ends 22 of the hook 21 are disposed adjacent the trailing end of the bucktail 16 and are free to swing relatively to the bucktail, even though a fish merely nips the trailing end of the bucktail in most cases this will result in the fish being hooked due to the free movement of the hook relatively to the bucktail.

Whereas conventional fish lures have the bucktail secured to the hook shanks so that an entirely new unit must be provided to change the size of the hook, with the lure 5 the fishhook eye 19 can be readily disengaged from the split ring 18 and a hook of a smaller or larger size quickly and easily substituted for the hook 21 and without otherwise disturbing or disassembling the lure 5.

Figure 3 illustrates another form of the fish lure, designated generally 23 and which differs from the lure 5 in that the lure 23 is provided with a relatively short rigid leader or shaft 24 having an eye 25 at its leading end and an eye 26 at its trailing end. The eye 25 is connected to a swivel 27 having a line or leader 28 fastened to its opposite end and the eye 26 is connected to a split ring 29, corresponding to the split ring 18 and to which a multi-barbed fishhook 30 is detachably connected in the same manner as previously described with reference to the fishhook 21. The fishhook 30 likewise corresponds to the fishhook 21 or may be of a smaller or larger size. A bucktail 31, corresponding to the bucktail 16 is secured by wrappings 32 to the rod or shaft 24 between the eyes 25 and 26 and has the hairs thereof extending rearwardly to beyond the free end of the fishhook 30. The spinner 15, sleeve 12 and enlargement 11 of the lure 5 are omitted from the lure 23. Otherwise, the action and use of the lure 23 corresponds to the lure 5 and a further description thereof is therefore considered unnecessary.

Various modifications and changes are contemplated and may obviously be resorted to, without departing from the spirit or scope of the invention as hereinafter defined by the appended claim.

I claim as my invention:

An artificial fishing lure comprising a rigid leader of substantial length, a stop fixed to the leader intermediate of the ends thereof, a bucktail rigid with one end of the leader and extending a substantial distance beyond that end thereof, said leader having an eye at that end having the bucktail and within the bucktail, a hook having means at one end thereof pivoted to the eye, the length of the hook being less than the length of the bucktail, said hook being adapted to be completely located within the bucktail, a sleeve loosely mounted on the leader and adapted to abut the stop, a spinner rotatably mounted on the leader and adapted to contact the sleeve, said stop, sleeve and leader being of such a length and the bucktail so closely confining the hook that the hook is incapable of contacting the spinner during a casting operation.

WILLIAM E. GAUTSCHE, Jr.

REFERENCES CITED

The following references are of record in the file of this patent:

UNITED STATES PATENTS

| Number | Name | Date |
|---|---|---|
| 1,389,763 | Kewell | Sept. 6, 1921 |
| 1,454,820 | Readle | May 8, 1923 |
| 1,754,567 | Newell | Apr. 15, 1930 |
| 1,874,883 | Brown | Aug. 30, 1932 |
| 2,021,796 | Liotta | Nov. 19, 1935 |
| 2,494,620 | Johnson | Jan. 17, 1950 |

FOREIGN PATENTS

| Number | Country | Date |
|---|---|---|
| 856,132 | France | May 30, 1940 |